May 25, 1926.
H. E. PRATT
ROLLER BEARING
Filed Oct. 22, 1918
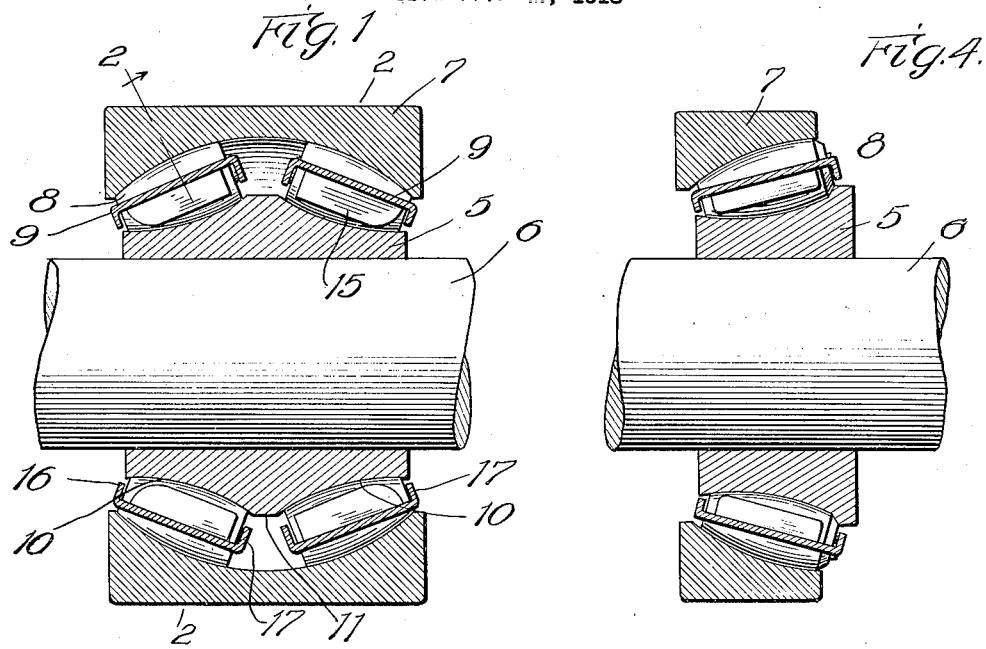
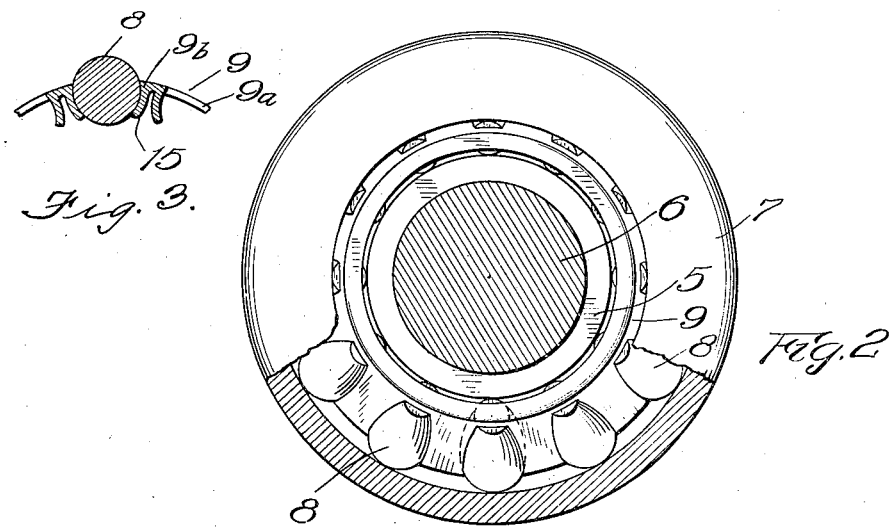
Inventor
Herbert E. Pratt
by Rector, Hibben, Davis & Macauley
his Attys Patented May 25, 1926.

1,585,690

UNITED STATES PATENT OFFICE.

HERBERT E. PRATT, OF CHICAGO, ILLINOIS, ASSIGNOR TO AKTIEBOLAGET SVENSKA KULLAGERFABRIKEN, OF GOTTENBORG, SWEDEN, A CORPORATION OF KINGDOM OF SWEDEN.

ROLLER BEARING.

Application filed October 22, 1918. Serial No. 259,288.

It is the purpose of my invention to provide a roller bearing for line shafting and the like which is self adjusting, capable of taking up end thrust, provides extended bearing surfaces, is relatively inexpensive to manufacture, and is durable and efficient.

Referring to the accompanying drawing forming a part of this application, Fig. 1 is an axial section of a double shaft bearing, the shaft being shown in elevation; Fig. 2 a partial transverse section on the line 2—2 of Fig. 1. Fig. 3 a transverse section of a detail on the line 3—3 of Fig. 1; and Fig. 4 a single bearing of the same type.

The bearing comprises an inner member 5 which is applied to the shaft 6, an outer member 7, and two similar sets of rolls 8 arranged at opposite sides of a central transverse plane and maintained in proper relation by retainers 9. The inner or bearing surface of the outer member 7 is circular in axial as well as longitudinal section or, in other words, is spherical, and the rolls 8 present the same curve in longitudinal section so that each roll has a line of contact with the outer bearing extending its entire length. The inner bearing member 5 is formed on opposite sides of its longitudinal center with raceways 10 separated by a central ridge 11, the raceways being likewise curved in longitudinal section, the curve being of the same radius as the internal curvature of the outer member so that with this inner member also each of the rolls has a line of contact extending throughout its length. As plainly seen in Fig. 1 the rolls are preferably larger at their inner or adjacent ends and the inner bearing member is of largest diameter at the central ridge 11 and slopes away on opposite sides thereof. As a result of the described construction the bearing is self adjusting, as obviously the inner member has a slight universal motion about the center of the spherical inner surface of the outer member, and end thrust will be transmitted from the inner to the outer member in an obvious manner.

The roll retainer or separator 9 is preferably cast of some suitable metal or material, the body 9ª thereof being frustro-conical and of such size that when the rolls are assembled therewith in the bearings it occupies a position somewhat outside of or beyond the conical surface in which lie the axes of the rolls. The retainer is formed with openings of a shape and size to fit about the respective rollers but somewhat smaller than the axial section of the rolls so that the latter cannot drop therethrough. Wings 15 are cast on opposite sides of the respective openings and when cast are parallel permitting the insertion of the rolls from the inside of the retainer. After a roll is in its opening the wings are bent about the roll as shown in Fig. 3 to retain it in place. Preferably the retainer is made of some anti-friction metal and the roll is free to turn easily in its opening but is held from falling either inward or outward in the manner described. Each retainer is also formed with inwardly directed flanges 16, 17 of such extent that their edges fit loosely about the inner bearing member so as to properly retain the separator in its concentric position.

In Fig. 4 I have shown a bearing which is in all respects like that shown in the other figures except that it is single and therefore will take up end thrust in one direction only. Obviously instead of the double bearing of Fig. 1 two bearings of the character shown in Fig. 5 may be employed.

In assembling the bearing whether of the single or double form, the sets of rolls are first inserted in their respective retainers and then applied to the inner bearing member. The outer bearing member in the case of the single bearing may be applied axially, but in the case of the double bearing must be turned at an angle before it can be slipped over the rollers.

It will now be seen that my improved bearing is self adjusting, adapted to take up end thrust as well as side thrust, provides extended bearing surfaces, and is relatively inexpensive to make and assemble. Obviously in some respects the construction can be modified or reversed without departing from my invention. Thus it is not essential that the rolls be of larger diameter at their inner ends as they may be symmetrical or even be larger at their outer ends, the shape of the inner bearing member being correspondingly changed. Again the body of the retainer may be made of such diameter as to lie within the frustro-conical surface which contains the axes of the rollers and the wings cast to extend outside the body, the rollers in this case being applied to their respective openings from the outside and the wings or lips serving to retain the rolls against outward movement. Obviously also the marginal flanges by which the retainer is maintained in concentric relation to the bearing members may extend outward to contact with the outer bearing member. Other changes within the invention will suggest themselves to those skilled in this art.

I claim:

1. In a bearing of the class described, an outer bearing member having a spherical inner bearing surface, an inner bearing member having a concave bearing surface thereon, the curve of the surface corresponding in axial section with the surve of the inner surface of the outer bearing member, the bearing surface on one member being of larger diameter at one end and the bearing surface on the other member being of larger diameter at the other end and a series of rolls of larger diameter at one end than at the other.

2. In a bearing of the class described an outer bearing member having a spherical inner bearing surface constituting two races, an inner bearing member having cooperating raceways at its respective opposite ends, said raceways being concave and curved in axial section corresponding to the axial curve of the inner bearing surface of the outer bearing member, and rollers curved in longitudinal section on the same radius of curvature of the raceways whereby each roller has a line of contact with each bearing member throughout its length.

3. In a bearing of the class described an outer bearing member having a spherical inner surface, an inner bearing member having an outer bearing surface which is concave longitudinally and of greater diameter at one end than the other, rolls between the bearing surfaces of greater diameter at one end than at the other and a frustro-conical roll retainer engaging said rolls.

4. In a roller bearing, the combination of an inner race, an outer race having a spherical rolling surface for the rollers, and two rows of rollers between said races, the axes of the rollers of the respective rows converging in cones having their axes on the bearing axis at opposite sides of the bearing, each of said rollers having an outwardly curved rolling surface of such shape that it bears against at least one of the rolling surfaces of said races along the greater portion of the length of the roller.

5. A self-adjusting roller bearing comprising inner and outer race rings one of which is formed with a spherically curved race and the other with a cooperating race, and rollers having axially convexed surfaces and whose greatest diameter lies nearer to one end of the roller than the other end.

HERBERT E. PRATT.